INVENTORS
Charles K. Bon
Marshall P. Neipert
Norman L. Piegols
BY Griswold & Burdick
ATTORNEYS United States Patent Office 2,780,360
Patented Feb. 5, 1957

2,780,360

REMOVING SUSPENDED SOLIDS FROM AQUEOUS LIQUIDS

Charles K. Bon, Marshall P. Neipert, and Norman L. Piegols, Midland, Mich., assignors to The Dow Chemical Company, Midland, Mich., a corporation of Delaware Application December 17, 1954, Serial No. 476,022

4 Claims. (Cl. 210—51)

This invention relates to a method of and apparatus for separating finely-divided solid matter from a liquid in which it is suspended. It more particularly concerns an apparatus for separating freshly precipitated finely-divided solids from the liquid in which precipitation is effected.

Heretofore in the separation of finely-divided solids from suspension in a liquid, as in water or brine purification, the method usually adopted consists in introducing into and mixing with the liquid a flocculating agent, the liquid being held in a large open top vessel in which provision is made for gentle agitation, flocculation, and settling. After the flocculating agent has been added, a flocculent precipitate is formed which entraps the finely-divided suspended matter and generally facilitates its settling so that a clear supernatant liquid results which may be decanted from the vessel separately from the suspended solids. In carrying out separations of the type above-indicated in conventional apparatus difficulties oftentimes arise which militate against obtaining a complete separation of the flocculated solid matter from the liquid in which it is formed or suspended. One of these difficulties is that small bubbles of gas, which are oftentimes released from solution in the liquid during the formation of flocculent precipitates, becomes attached to the particles of suspended matter and these then tend to float rather than sink. As a consequence, more or less of the solid suspended matter is carried off with the supernatant effluent instead of being separated therefrom.

Accordingly, it is an object of the invention to provide an improved method of and apparatus for the separation of finely-divided solids from liquids in a more efficient manner. A particular object is to provide a method of and means for disengaging gas bubbles from flocculent precipitates so that settling of gas buoyed flocs in a liquid can occur thus permitting improved separation of the flocs from the liquid. These and further objects will be understood from the following description taken in conjunction with the accompanying drawing.

In order that the invention may be clearly understood and readily carried into effect reference is made to the accompanying drawing which shows diagrammatically and by way of example an embodiment of the invention.

In the said drawing.

Figure 1:
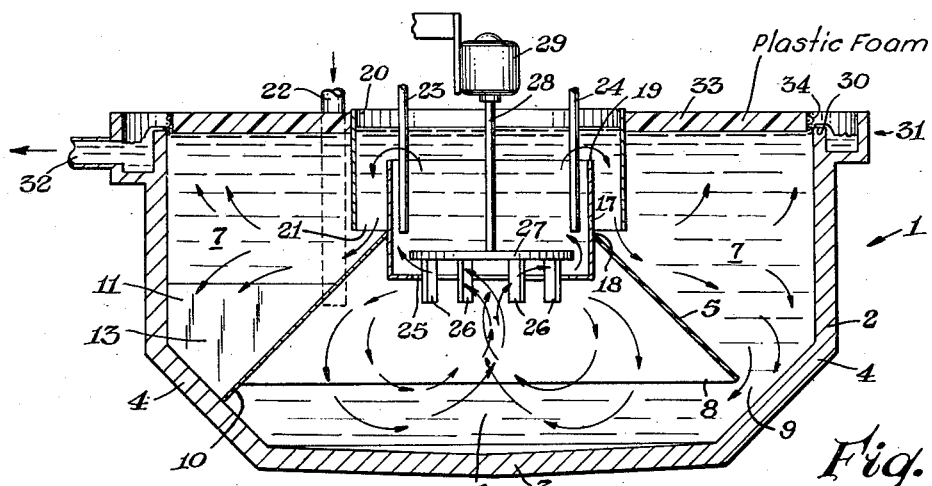
Fig. 1 is a vertical section of the apparatus in accordance with the present invention.
Figure 2:
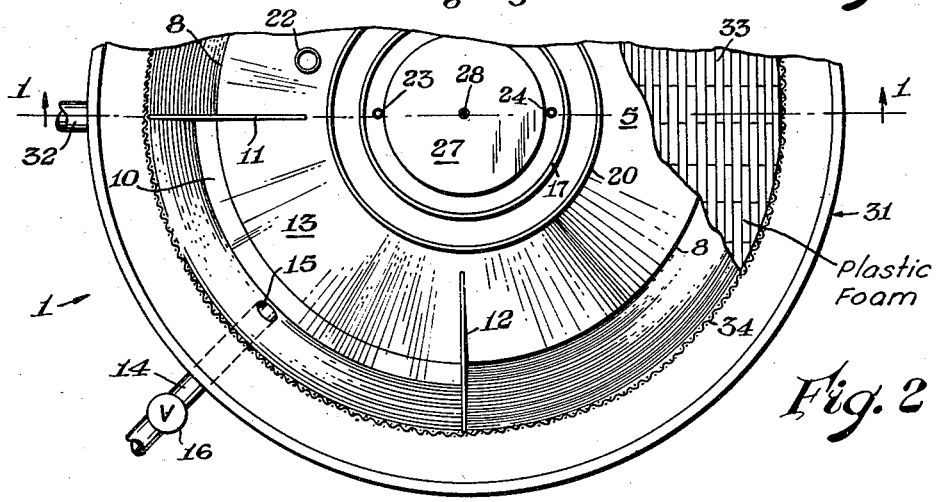
Fig. 2 is a fragmentary plan view of the apparatus with a portion of the cover cut away.

Referring in detail to the drawing, there is shown a vessel 1 adapted to contain a quantity of the liquid to be purified. The vessel is of circular contour and its diameter is generally greater than the depth. The vessel is defined by the vertical cylindrical side wall 2 and the slightly conical bottom 3 which is joined to the side 2 by the sloping wall member 4. A conical baffle 5 is centrally disposed within the vessel and generally divides the inside of the vessel into two communicating compartments, one below the baffle referred to herein as the reaction zone 6 and the other above the baffle as a clear or settling zone 7. The lower edge 8 of the baffle 5 is spaced from the wall member 4 so as to leave a passageway 9 for the passage of liquid from zone 7 to zone 6. This passageway extends as much as three-fourths of the way around the inside of the vessel. The lower edge of the remaining one-quarter of the way around the inside of the vessel is joined to the wall of the vessel by metal strip 10. Two spaced apart vertical partitions 11 and 12, respectively, one at each end of the strip, are provided between the inside of the vessel and part way up the upper side of the baffle 5. These partitions together with strip 10, a portion of baffle 5, and portions of wall members 2 and 4 provide an open top inner vessel 13, within vessel 1, which serves as a concentrating zone. A pipe 14 with open end 15 extends through the wall of the vessel 1 into the concentrating zone. Valve 16 on pipe 14 permits control of the discharge from the concentrating zone. Centrally disposed within the vessel 1 is an inner cylindrical baffle 17, the wall of which is joined around its periphery to the upper edge 18 of the conical baffle 5. The top 19 of the baffle 17 is below the top of the vessel. Outside and concentric with baffle 17 is another baffle 20 which extends downwardly from above the top of the vessel to within a short distance of the baffle 5 leaving an annular passageway 21 between the surface of baffle 5 and the lower edge of baffle 20. An inlet pipe 22 for the liquid to be treated enters the top of the vessel and extends through baffle 5 into the reaction zone 6. Chemical feed pipes 23 and 24 extend into the vessel inside baffle 17. Centrally disposed in baffle 17 and extending below the circular opening 25 are agitator blades 26 which are mounted on the underside of plate 27. Plate 27 is attached to the lower end of the drive shaft 28 which is revolved by the motor 29. Around the rim 30 of the vessel is a launder 31 which collects the overflow from the vessel 1, the overflow being discharged through the outlet 32.

As shown the vessel 1 is filled with liquid and on the surface thereof, in accordance with the invention, in the annular space between the inside of the wall 2 and the outside of baffle 20 is a floating cover of pieces of plastic foam 33 making a layer of substantial thickness. The pieces are in the form of planks or boards or pieces thereof cut and arranged so that the exposed surface of the liquid in the aforesaid annular space is covered with closely fitting pieces except for the cracks between the sides of the adjacent pieces of the plastic foam which allow escape of gas from the liquid as shown in detail in Fig. 3. The plastic foam is inert to the suspension.

In operation, the liquid to be treated, which may be a potable or unpotable water or brine, is fed into the vessel through inlet pipe 22 continuously. At the same time, the proper amounts and kinds of treating chemicals are introduced into the vessel through feed pipes 23 and 24, as required, while the agitator is set in motion.

Figure 3:
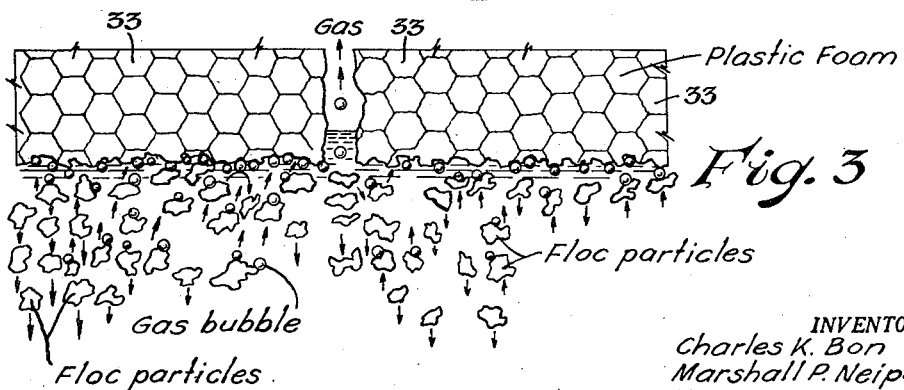
Fig. 3 is an enlarged view of a portion of the apparatus shown in Fig. 1.

The agitator brings about circulation of the liquid within the reaction zone and from the reaction zone 6 to the settling zone 7 and concentrating zone 13 as indicated by the arrows in Fig. 1. Liquid also passes from the settling zone 7 through the passageway 9 to the reaction zone 6. As the circulation of liquid takes place, the treating chemicals introduced through pipes 23 and 24 become uniformly dispersed with the liquid especially in the reaction zone where precipitation takes place. In time as the liquid circulates the precipitates formed in the reaction zone flocculate and are carried into the settling zone and some of the resulting floc is carried to the underside of the floating plastic foam covered by gas bubbles which are released from the liquid as precipitation and floc formation occur. The exact composition of the gas of the bubbles has not been determined but it is believed to be a mixture of air and carbon dioxide released from solution by chemical and physical action. Floc so carried up to the underside of the floating plastic foam cover loses its gas as the floc makes contact with the plastic foam. The gas so-released escapes between the pieces of foam as indicated in Fig. 3 while the gas-free floc settles. As the floc settles, some falls into the concentrating zone 13 where it is trapped and can be removed through pipe 14 on opening valve 16. The remainder recirculates until caught in the concentrator. The resulting floc-free liquid which is obtained near the rim of the vessel at the upper surface of the liquid spills over the rim 30 into the launder 31 and is removed through outlet 32.

The floating pieces of plastic foam are prevented from being carried into the launder by a screen 34 extending above the rim 30 of the vessel.

The plastic foam, found to bring about the separation of the gas bubbles attached to floc particles in aqueous media, is of the closed cell type. That is to say, the plastic is a polymer, e. g. polystyrene, which is swollen by expansion of a gas which is absorbed in the plastic while under pressure so that on releasing the pressure, while the plastic is at moderately elevated temperature, the plastic swells due to the gas expansion. The so-obtained swollen plastic assumes the form of a somewhat elastic non-brittle cellular body composed for the most part of individual closed cells. Each cell has a number of more or less thin plane walls like the walls of a honeycomb. On cutting through a piece of such plastic foam so as to obtain a generally plane face, the cells intersected by the cutting tool, e. g. a saw, are opened exposing the interior of numerous cells which appear as recesses in the face of the piece. These recesses are defined by the thin plane walls of the cells. In the present invention, use is made of this recessed surface by bringing it into contact with the surface of the liquid in vessel 1 where it has the unique property of detaching gas bubbles from particles of floc so that a clear supernatant liquid is decanted over the rim of the vessel into the launder.

The size of the cells of the plastic foam does not appear to be sharply critical and may fall in the range of cell sizes normally present in commercially available closed cell plastic foam. Cells more or less equiaxed and having diameters of 0.01 to 0.25 inch are effective for the purpose, for example.

As illustrative of the practice of the invention, the following example is cited:

*Example*

In this example, a vessel of the type indicated in the drawing was used having a diameter of 50 feet and overall depth of 16½ feet. It was filled with a nearly saturated solution of sodium chloride in water which contained 578 p. p. m. (parts per million) of $CaSO_4$ and 80 p. p. m. of $MgCl_2$ as impurities. Solution of this composition was introduced continuously into the vessel, as through inlet 22, at the rate of 1075 gallons per minute while the resulting treated solution was discharged from outlet 32 at a corresponding rate. The impurities were precipitated by the addition of $Na_2CO_3$, NaOH, and a flocculator of $FeCl_3$. Precipitation of the calcium as calcium carbonate was brought about by the addition of $Na_2CO_3$ in amount sufficient to produce a concentration of about 540 p. p. m., the addition being made to the salt solution before it was introduced into the vessel. The sodium hydroxide was added as a 10 percent aqueous solution through feed pipe 23 at the rate of 7.4 pounds of NaOH per minute. The $FeCl_3$ was added through feed pipe 24 as a 46 percent aqueous solution at the rate of 270 cc. per minute. About 10 grams per minute of starch was added as a 4 percent corn starch solution in a 2 percent aqueous caustic soda solution. After allowing time for uniform operating and precipitating conditions to prevail analyses of the effluent from outlet 32 were made when operating both with and without a cover of plastic foam, as described, with the following results:

With a plastic foam cover (closed cell foamed polystyrene planks 6–8 inches wide, 6 feet long, 2 inches thick):

Total hardness as Ca+Mg=3 p. p. m.
Total iron as Fe=nil
Effluent clear

In the absence of the cover, other conditions being the same:

Total hardness as Ca+Mg=25 p. p. m.
Total iron as Fe=2 p. p. m.
Effluent not clear Among the advantages of the invention are that disturbances in the suspension due to wave action as when a strong wind blows over the surface of the suspension are prevented; temperature gradients between the surface of the suspension and the body of the suspension which produce convection currents that interfere with settling are greatly reduced or eliminated; gas bubbles adhering to suspended solids, carried to the surface by the gas bubbles, are detached from the suspended solids allowing them to settle so that an improved clarification is obtained.

We claim:

1. In a method of separating a flocculent precipitate from an aqueous suspension thereof which is subject to sedimentation in a more or less quiescent body thereof wherein at least a portion of the floc becomes buoyant, instead of settling, due to the adhesion of gas bubbles to pieces of the floc, the improvement which consists in bringing into contact with the gas bubble loaded floc particles, at the upper exposed surface of the suspension, the rough face of pieces of plastic foam having a closed cell structure, the said plastic foam being in discrete floating pieces whereby the plastic foam detaches the gas bubbles from the floc particles allowing them to sink in the aqueous suspension and the gas to escape between the pieces of the plastic foam.

2. The method according to claim 1 in which the plastic foam consists of polystyrene.

3. In an apparatus for separating finely-divided solids from a liquid suspension thereof the combination of a vessel adapted to contain the suspension and provide for sedimentation therein, said vessel having a rim of uniform height, a launder below the rim around at least a portion of the vessel adapted to collect liquid discharged from the vessel over the rim, discrete pieces of a closed cell plastic foam adapted to float upon the upper surface of the suspension as a cover therefor, the face of the pieces of foam in contact with the suspension being sectioned so as to expose the interior of foam cells to the suspension whereby floc particles buoyed up to the surface by adhering gas bubbles are separated from the gas bubbles by contact with the walls of the plastic foam cells permitting the resulting floc to settle.

4. The apparatus according to claim 3 in which the plastic foam is foamed polystyrene.

References Cited in the file of this patent

UNITED STATES PATENTS

| | | |
|---|---|---|
| 1,690,682 | Imhoff | Nov. 6, 1928 |
| 2,499,054 | Collins et al. | Feb. 28, 1950 |
| 2,694,743 | Ruskin et al. | Nov. 16, 1954 |